July 6, 1948. L. P. FRIEDER ET AL 2,444,642
BALLOON APPARATUS AND PARACHUTE
ASSOCIATED THEREWITH
Filed Dec. 18, 1946 3 Sheets-Sheet 1
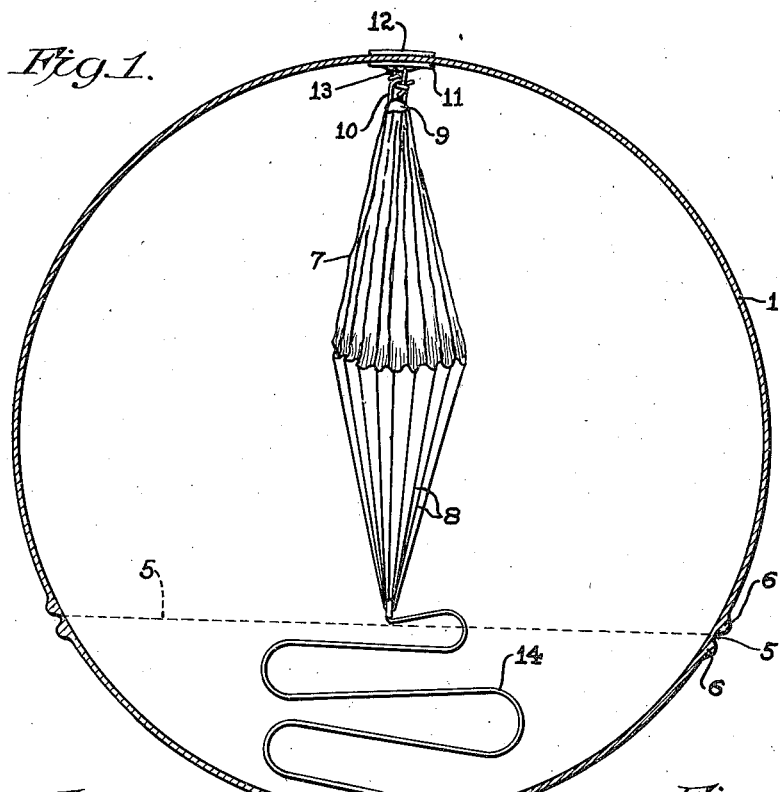
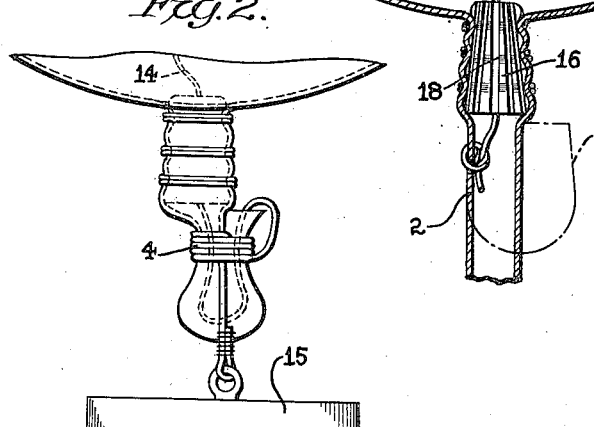
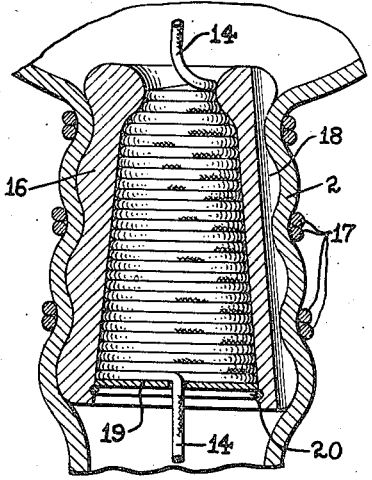
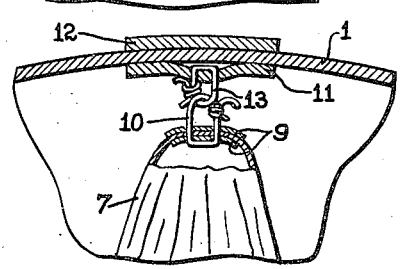
INVENTORS
Leonard P. Frieder and
BY Walter S. Finken
Robert S. Dunham
ATTORNEY July 6, 1948.

L. P. FRIEDER ET AL 2,444,642

BALLOON APPARATUS AND PARACHUTE
ASSOCIATED THEREWITH

Filed Dec. 18, 1946

INVENTORS
Leonard P. Frieder and
BY Walter S. Finken

Robert S. Dunham
ATTORNEY

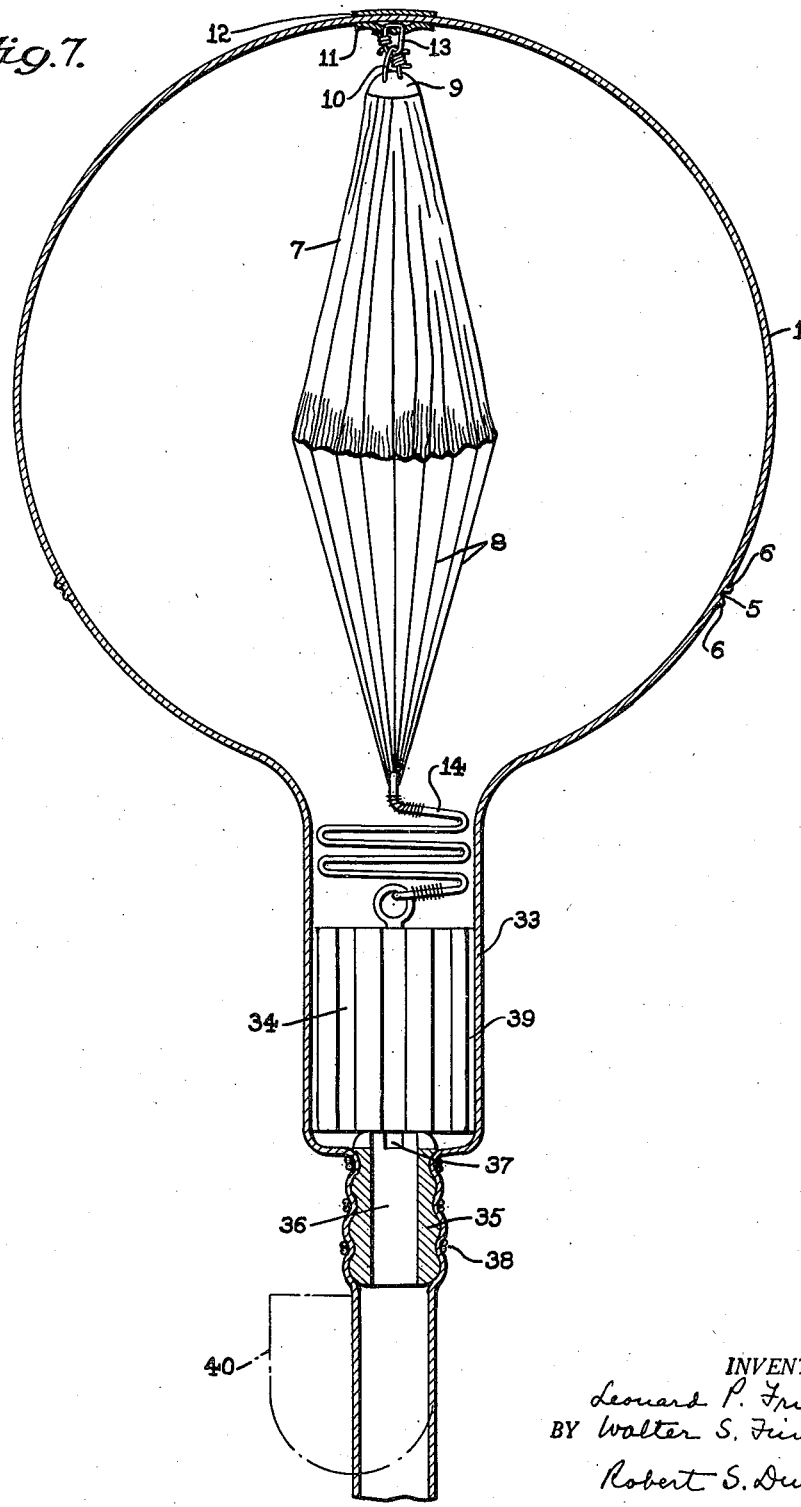

Patented July 6, 1948

2,444,642

UNITED STATES PATENT OFFICE 2,444,642

BALLOON APPARATUS AND PARACHUTE ASSOCIATED THEREWITH

Leonard P. Frieder, Great Neck, and Walter S. Finken, Brooklyn, N. Y.; said Finken assignor to said Frieder Application December 18, 1946, Serial No. 717,062

17 Claims. (Cl. 244—32)

Our present invention relates to a balloon apparatus and a parachute associated therewith. More particularly the invention relates to such apparatus for use in supporting and conveying a load to a high altitude and thereafter for lowering the load back to earth without damage thereto or to personnel on the ground.

When taking a meteorological reading using pilot balloons, it is common practice to suspend various recording instruments from balloons to carry such instruments to a high elevation above the earth, so as to indicate and/or record various meteorological conditions at different altitudes. In some cases parachute apparatus has been used in association with the apparatus aforesaid for lowering the instruments to the earth following its elevation to the desired altitude. These parachutes have been particularly useful when a balloon is used which will burst or may burst upon being expanded beyond its limit of expansion. This normally occurs when the balloon attains a sufficiently high altitude so that the internal gas pressure greatly exceeds the rarefied atmosphere outside the balloon.

When using such a combination of balloon, parachute and load of this character, quite frequently the balloon may pass through cloud banks or moisture-laden air, which precipitates upon the surface of or is absorbed by the parachute fabric. This collection of moisture causes a substantial increase in weight of the parachute. Due to this increased weight, the maximum altitude attainable by the balloon is decreased. The precipitated moisture may also interfere with the desired opening of the parachute to support the load and retard its descent. This is especially true if the parachute absorbs a substantial amount of moisture and then passes into a lower temperature zone so that the fabric becomes frozen. When using a parachute made of paper, movement of its surface incident to the inflation of the parachute while thus frozen will cause the paper to rip, so that the utility of the parachute is destroyed.

A primary object of the present invention is to overcome certain of these difficulties by enclosing the parachute wholly within the balloon. This protects the parachute, during its ascent, against the absorption of water and against damage incident to freezing and tearing, etc. In accordance with our present invention, there is provided a balloon, which houses a parachute and hermetically seals it against outside elements.

A further object of the present invention is to provide also for the housing of the instrument to be carried by the balloon within the balloon or a part thereof.

A further object of the present invention is to provide for the actuation of a recording instrument sealed within a balloon in response to the expansion of the balloon itself. This expansion is a function of the atmospheric pressure at the place where the balloon may be at any given time, as compared to a predetermined degree of expansion of the balloon at ground level. Suitable corrections for different ground level conditions may be predetermined and set on the instrument.

A further object of the present invention is to provide apparatus of the character above set forth, wherein the balloon is so constructed and arranged and inflated to such an extent that the pressure at which it will burst may be predetermined. The arrangement is then such that on the bursting of the balloon, the weight of the instrument or load will be assumed by a parachute. Up to this time the parachute has been completely enclosed within the balloon both as to the parachute canopy and the shroud lines thereof.

A further object of the present invention is to provide an electric switch apparatus associated with the balloon. Such apparatus may be responsive to some predetermined degree of expansion of the balloon itself. It may also be arranged to respond to the bursting of the balloon and the assuming of the support of the load by a parachute theretofore contained within the balloon as aforesaid. The electric switch may be arranged to complete a circuit to actuate any desired electrically operated mechanism or instrument.

Other and more detailed objects of the present invention will become apparent from the following specification and appended claims, when considered in connection with the accompanying drawings, in which:

Figure 1 is a view substantially in central vertical section illustrating a parachute disposed within a balloon in readiness for inflation and ascent;

Fig. 2 is a fragmentary detailed view substantially in elevation illustrating the neck portion of a balloon connected to a load, the neck being closed following the inflation of the balloon;

Fig. 3 is a fragmentary detailed view on an enlarged scale illustrating the connection of the canopy portion of a parachute to the inside of a balloon at a point distant from the neck thereof;

Fig. 4 is a fragmentary detailed view substantially in central vertical section, illustrating the interior of the neck of a balloon arranged for cooperation with a parachute as aforesaid and particularly showing means in which the line is stored connecting the shroud lines of the parachute with the load and so as to permit of the expansion of the balloon upon its ascent;

Fig. 7 is a view similar to Fig. 1 showing a modified form of the invention wherein a load is itself enclosed within the neck portion of a balloon.

Figure 5:
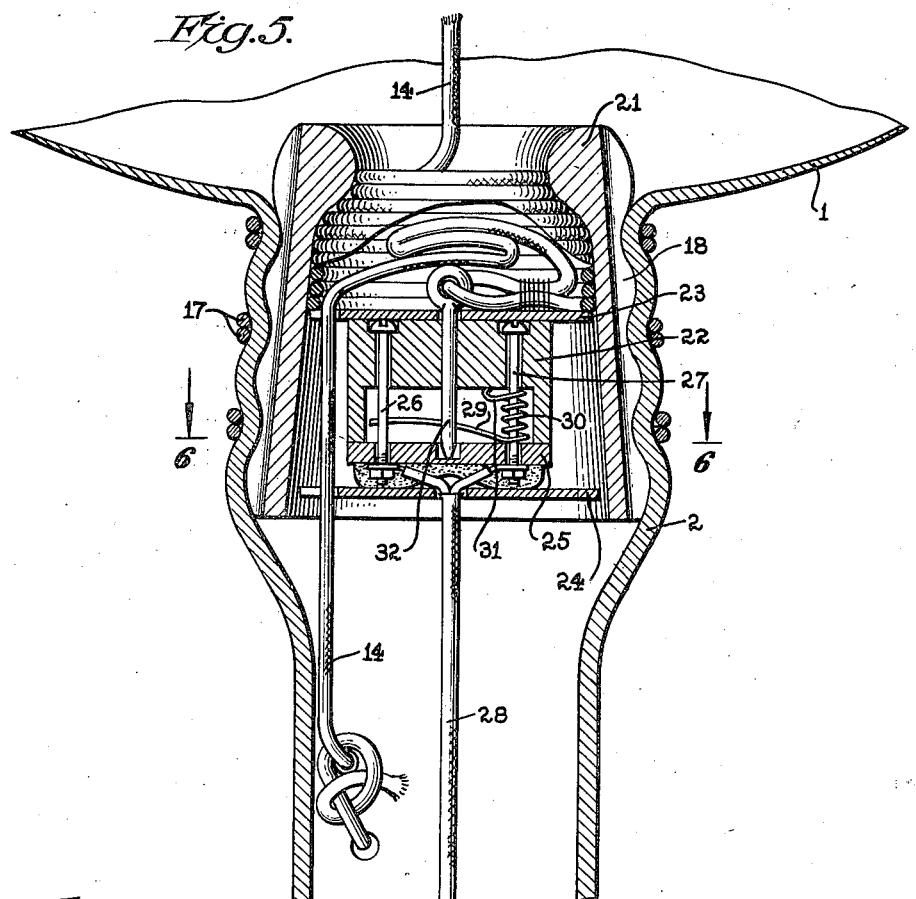
Fig. 5 is a view similar to Fig. 4, but on a larger scale illustrating a modified form of the invention wherein an electric switch is incorporated in the neck portion of a balloon, this form of the invention being usable either with or without an enclosed parachute.

Turning now to the accompanying drawings, and particularly to Figs. 1 to 4 thereof, we have shown a balloon 1, comprising a bladder or diaphragm, which may be of substantially spherical contour, as shown, or alternatively of any other desired shape. This balloon has a neck portion generally indicated at 2. It may be inflated with any lighter-than-air gas or mixture thereof, such as hydrogen, helium or the like. Subsequent to the inflation, the neck 2 may be turned upon itself as indicated at 3, in dotted lines in Fig. 1. The neck may thereafter be suitably bound as indicated at 4, Fig. 2, to prevent the escape of the inflating gas.

If desired, provision may be made for a weakened area or tearing line on the balloon. For this purpose there is shown a circumferential line of weakness indicated at 5, Fig. 1, bounded by thickened or reinforced portions 6. The structure thus far described may be considered for the purpose of the present application as a part of the prior art.

Preferably associated with and enclosed completely within the balloon 1, is a parachute 7 of any conventional or desired type. This parachute may be introduced into the interior of the balloon through the neck 2 thereof prior to inflation.

The usual parachute shroud lines generally designated at 8 are also enclosed in the balloon 1 and are introduced thereinto with the parachute 7. While the parachute is usually introduced into the balloon in folded form, this is not always done, and is not essential in accordance with the present invention.

While for some purposes it may be unnecessary that the parachute be connected to the inside of the balloon, it is usually preferred that there be such a connection for reasons which will more particularly appear hereinafter. To this end, the central portion of the canopy of the parachute is connected in any conventional way to a point on the inside of the balloon 1, preferably distant from and usually substantially opposite to the neck 2 thereof. As particularly shown in Figs. 1 and 3, the central portion or apex of the canopy or sail of the parachute 7 may have inner and outer reinforcing parts 9 suitably secured thereto. Arranged to be supported from these reinforcing parts is a connecting loop of string, wire or other desired material. The balloon itself may similarly have inner and outer reinforcing patches 11 and 12, respectively. These patches may be of the same material as the balloon, or any other desired material. They are secured to the balloon in any suitable manner as by the use of some adhesive or by vulcanization in the event that the balloon and patches 11 and 12 are of rubber or rubber-containing material. As shown, the inner patch 11 supports a loop 13 of suitable material, such as string or wire. This loop 13 may be connected to the loop 10 as best shown, for example, in Fig. 3.

The shroud lines of the parachute are connected to the neck portion thereof by a load line 14 as best shown in Fig. 1. Thus, if the balloon is expanded to such an extent that it will burst, the support of the load indicated at 15 in Fig. 2 will be assumed by the parachute. This normally occurs upon the separation of that portion of the balloon to which the parachute is attached from that portion to which the load is attached and the consequent tensioning of the line 14.

If desired, the line 14 may itself be used as the means for binding the neck portion in a gas-tight condition, Fig. 2. As shown this line is continuous from the inside of the balloon as indicated at the upper portion of this figure through to the load 15. On the other hand, the line and load may, if desired, be independently connected to the neck portion of the balloon. A separate means may be used for binding the neck in a condition to confine the inflating gas within the balloon.

The load line 14 is usually of such length as to permit of the maximum expansion possible for the balloon prior to the bursting thereof without tensioning this line. To this end a substantial length of the line 14 may be provided within the balloon as particularly shown in Fig. 1. This will insure of there being no tension upon this line or therethrough to the connecting point of the parachute to the balloon indicated at 9 to 13 inclusive. In some instances it may be desired that this additional length of the line 14 provided for the purposes aforesaid be not permitted to move at random within the balloon as in Fig. 1. To this end the line may be coiled in a predetermined fashion so that it may uncoil upon the progressive expansion of the balloon. For this purpose a shield member 16 may be disposed within the neck portion of the balloon as shown in Figs. 1 and 4. This shield is of a substantially hollow conical shape with annular grooves therearound for permitting the neck portion 2 of the balloon to be bound around the shield by suitable binding means shown at 17. These binding means are separate from the line 14 in the form of the invention shown in Fig. 4. The shield 16 may further be provided with a plurality of substantially longitudinally extending grooves 18 on the outer surface thereof as shown in Figs. 1 and 4, to permit the substantially free passage of inflating gas past the shield after the shield has been bound in position as shown in Fig. 4 by the binding means 17. The excess length of the line 14 provided may be coiled within the shield 16 as particularly shown in Fig. 4. This line will unwind from the interior of the coil thereof within the shield 16. As further shown in this figure, the lower end of the coil may be supported upon a suitable panel 19 of pasteboard or other suitable material. This panel may be retained in position by a conventional metallic spring ring 20 received within an annular groove inside the shield 16. The line 14 is shown as passing through a central aperture in the panel 19 for connection with the neck or therefrom to the load as shown, for example, in Figs. 1 or 2.

It is contemplated that under certain circumstances, it may be desirable to actuate some electrical means employed with the balloon and/or parachute apparatus aforesaid. Means are provided for closing an electric circuit either upon some predetermined degree of expansion of the balloon itself and prior to the bursting thereof, or upon the bursting of the balloon.

Figure 6:
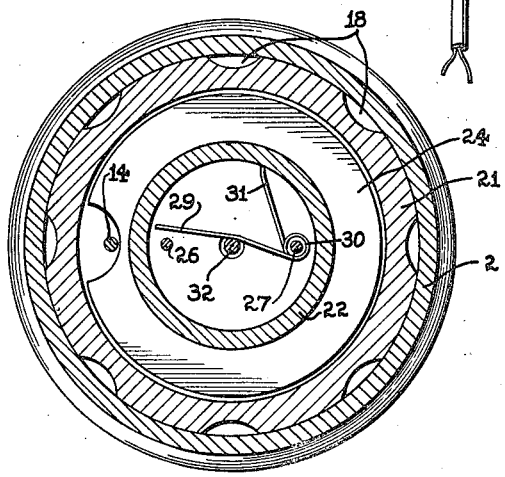
Fig. 6 is a view substantially in transverse, horizontal section taken on the line 6—6 of Fig. 5.

As shown, particularly in Figs. 5 and 6, the neck portion 2 of the balloon 1 is provided with a somewhat modified form of shield 21. Within this shield is arranged an electric switch means contained within a housing 22 supported between a pair of spaced and substantially parallel wall members 23 and 24. These members may be secured within the shield 21 in any conventional manner (not shown herein) including the manner in which the panel 19 is secured within the shield 16, Fig. 4.

While the electric switch means used may be of any desired type, we have chosen for purposes of illustration, a simple arrangement wherein a switch is provided which is spring pressed toward a circuit-closing position. Means are provided associated with the switch to prevent such closing pending the happening of an event which is intended to operate to close the circuit. As particularly shown in Figs. 5 and 6, the housing 22 is provided with a closure 25. The closure is retained in position in the housing by a pair of nuts and bolts 26 and 27, extending therethrough and serving respectively as the two terminals of the switch. Either the housing 22 and closure 25 are both of insulated material or at least one of these nuts and bolts 26 or 27 is suitably insulated from the housing or closure thereof. The switch terminals may be connected by suitable wires contained within a cable 28 to any desired means including the remainder of an electric circuit and particularly including a suitable source of E. M. F. The character of this circuit and the means actuated thereby form per se no part of the present invention and therefore are not illustrated herein. The movable element of the switch comprises a piece of spring wire 29 having a part coiled around the bolt 27 as shown at 30. One end 31 of the wire 29 is arranged in abutting relation with a part of the interior of the housing 22. The torsion of the wire 29 due to the coiled part 30 is such that it tends to make electrical contact with the bolt 26 whenever this action is permitted. The wire is always in electrical contact with the bolt 27. A centrally located removable pin or retainer 32 is provided, which in the position of the pin shown in Figs. 5 and 6, prevents such electrical contact from being made with the bolt 26 by preventing the counterclockwise movement of the free end of the wire 29 from the position shown in Fig. 6. Means are provided for moving the pin or retainer 32 upwardly out of the position shown to permit the closing of the switch upon the occurrence of the controlling event.

The switch may be operated in response to a predetermined expansion of the balloon. For this purpose the pin 32 may be connected, for example, to some predetermined part of the load line 14. Thus this line will be tensioned to pull the pin 32 out of the path of the wire 29 when the balloon has been expanded to the predetermined desired control point. The upper end of the load line 14, as seen in Fig. 5, is in effect connected to a point on the inside of the balloon distant from the neck thereof either directly, or as seen in Fig. 1, through the shroud lines 8 and canopy of a parachute 7. Then, as shown in Fig. 5, the pin 32 being connected to the line 14 and the length of this line being predetermined, the pin will be withdrawn from the position shown in the drawings at a time when the balloon is expanded to some predetermined extent.

On the other hand, it may be desired to pull the pin 32 and thereupon to permit the closing of the electric circuit through the switch only upon the bursting of the balloon. For this operation the point of connection of the pin 32 to the line 14 will be such that there is ample length of the line 14 between the point of connection with the pin 32 and with the balloon. This will permit more than the greatest possible expansion of the balloon prior to the tensioning of the line 14 and the consequent withdrawal of the pin 32 from the position shown in Figs. 5 and 6. Either such arrangement is to be considered within the purview of this invention.

Turning now to the form of the invention shown in Fig. 7, there is provided a balloon containing a parachute and shroud lines substantially as hereinabove described. The parts, insofar as they are the same or similar, are designated by the same reference characters. The purpose of this form, however, is to provide an apparatus wherein a recording instrument or other apparatus corresponding to the load is also wholly enclosed within and consequently protected by the balloon itself.

For this purpose, the balloon 1 shown in this figure is formed with an enlarged neck portion 33 of such size and configuration as to permit the introduction therein of an instrument generally designated 34. The internal character of this instrument forms per se no part of the present invention and hence is not disclosed in further detail. The instrument 34 may be supported above a hollow bushing 35, which is suitably bound within a lower part of the neck of the balloon. The bushing 35 is provided with a central passage 36 having lateral openings 37 therefrom to permit of the inflation of the balloon subsequent to the assembly of the parts in the position shown. The bushing 35 is suitably secured in a small diameter portion of the neck 33 of the balloon by binding means 38 and serves to support the instrument 34. The instrument may be provided with an outer casing having a plurality of longitudinal grooves 39 through which the inflating gas may pass into the interior of the balloon during the inflation thereof. The end of the neck portion 33 of the balloon may be bent upon itself as indicated in dotted lines at 40 subsequent to the inflation. This mechanism may thereafter be suitably bound against the leakage of gas therethrough in any desired manner, including that shown in detail in Fig. 2.

In the form of the invention shown in this figure, the balloon is connected to the instrument 34 by enclosing it. The instrument may be connected to the shroud lines 8 of the parachute by the load line 14 as shown in detail in the drawing. A suitable length of this line is provided to permit of the desired maximum expansion of the balloon as aforesaid. As shown in this figure, the instrument itself may also be protected against moisture as stated above.

Furthermore, if desired the instrument may record or indicate the barometric pressure at the place where the balloon may be at any given time in response to the expansion of the balloon. For this purpose the load line 14, which connects through to a point in the balloon distant from the neck thereof via the shroud lines 8 and parachute 7 may be of suitable length so that the expansion of the balloon will directly affect the instrument 34 when the slack in line 14 is taken up. The line may be arranged to control some mechanism within this instrument. The details of means for effecting this result are not disclosed herein as these details form per se no part of the present invention.

While we have shown and described but a few embodiments of our present invention, it will be obvious to those skilled in the art from the foregoing that interchange may be made in the apparatus so specifically described. Other changes may be made as will suggest themselves to those skilled in the art, and which are included within the appended claims. These claims are to be construed validly, as broadly as the state of the prior art permits.

What is claimed is:

1. An apparatus for launching a loaded parachute, consisting of a free balloon of the lighter-than-air type so constructed that it will burst when it reaches a rarified atmosphere during its ascent, a parachute confined within the balloon which is freed by bursting of the balloon, and a load on the exterior of the balloon connected to the parachute in such manner that descent of the load will be retarded by the parachute after the balloon bursts.

2. An apparatus for the purpose stated, comprising a lighter-than-air balloon consisting of a stretchable material containing a lighter-than-air gas and having a yield point at which the balloon will burst by expansion of the gas in rarified atmospheres, a parachute within the balloon which is freed to retard descent of a load when the balloon bursts, a load on the exterior of the balloon, and means connecting the load to the parachute.

3. An apparatus for launching a parachute at high altitudes, comprising a balloon constructed of stretchable material having a bursting point and containing enough of a lighter-than-air gas to raise the balloon and stretch it beyond said bursting point by expansion of said gas when the balloon reaches a sufficiently rarified atmosphere, a parachute enclosed within the balloon, a load on the exterior of the balloon, and means connecting the load to the parachute, whereby the parachute will assume support of the load when the parachute is freed by the bursting of the balloon.

4. An apparatus for launching a parachute and its load at high altitudes, comprising a balloon so constructed that it will burst when expanded beyond a yield point and containing enough of a lighter-than-air gas to raise the balloon and burst it when expansion of the said gas in a rarified atmosphere expands the balloon beyond said yield point, a parachute canopy and connected shroud lines and a load line enclosed within the balloon which are set free when the balloon bursts, and a load on the exterior of the balloon connected to one end of the load line, the other end of said load line being secured to the parachute shroud lines.

5. An apparatus for launching a parachute and its load, comprising a parachute canopy, a set of shroud lines and a load line, a rubber balloon enclosing said canopy, shroud lines and load line and having its wall so constructed that it will burst when expanded beyond a predetermined yield point, a neck on the balloon through which a lighter-than-air gas may be introduced to inflate the balloon, one end of the load line being secured within said neck and the other end of the load line being secured to the parachute shroud lines.

6. An apparatus for launching a parachute and its load, comprising the parachute canopy and a set of shroud lines, a rubber balloon enclosing said canopy and shroud lines and having its wall so constructed that it will burst when inflated beyond an approximate predetermined diameter, a neck on the balloon through which a lighter-than-air gas may be introduced to inflate the balloon and which is of sufficient length to permit folding it upon itself and securing it to confine said gas within the balloon and constituting a means to which the load may be attached, and means for connecting the load and the parachute shroud lines through the balloon neck.

7. An apparatus for launching a parachute and its load, comprising a rubber balloon containing enough of a lighter-than-air gas to raise the balloon and burst the balloon by expansion of the said gas when the balloon reaches a high enough altitude, a parachute canopy, shroud lines and a load line within the balloon which are set free when the balloon bursts, the load for the parachute being connected through the balloon to one end of the load line and the other end of the load line being connected to the parachute shroud lines.

8. An apparatus for launching a parachute and its load at high altitudes, comprising a thin-walled rubber balloon containing enough of a lighter-than-air gas to raise the balloon and burst the balloon by expansion of said gas when the balloon reaches a high enough altitude, a parachute sail and parachute shroud lines within the balloon which are freed when the balloon bursts, and a load on the exterior of the balloon connected through the balloon to the parachute shroud lines.

9. An apparatus for launching a parachute and its load, comprising a balloon shaped diaphragm containing enough of a lighter-than-air gas to raise said diaphragm and burst it by expansion of the said gas when the diaphragm reaches a high enough altitude, a parachute canopy, shroud lines and a load line within the diaphragm which are set free when the diaphragm bursts, the load for the parachute being connected to one end of the load line and the other end of the load line being connected to the shroud lines of the parachute.

10. An apparatus for the purpose stated, which comprises a balloon bladder composed of stretchable material and so constructed that it will rupture when stretched by expansion beyond the elastic limit of the material, a neck on the bladder through which a lighter-than-air gas may be introduced to inflate the bladder and which is long enough to permit folding a part of it upon itself to confine the gas within the bladder and provide a means to which the load may be attached, a parachute canopy having its apex attached to the inner wall of the balloon bladder at a point opposite to said neck, shroud lines connected to the parachute canopy, a shield within the neck of the bladder having means for the passage of said gas past the shield in inflating the balloon bladder, and a load line coiled within said shield and having one of its ends secured to the parachute shroud lines and its other end secured within the neck of the balloon bladder.

11. An apparatus for the purpose stated, which comprises a balloon bladder composed of stretchable material and so constructed that it will rupture when stretched beyond the elastic limit of the material, a neck on the bladder through which a lighter-than-air gas may be introduced to inflate the bladder and which is long enough to permit folding it upon itself and securing it to confine the gas within the bladder, a parachute canopy attached by its apex to the inner surface of the bladder at a point opposite said neck, shroud lines connected to the canopy, a load line coiled within the balloon neck having one of its ends secured within said neck and its other end secured to the shroud lines, and a shield within the balloon neck surrounding the coils of the load line and holding them against accidental displacement.

12. An apparatus for the purpose stated, comprising a balloon bladder composed of a stretchable material, a neck on the bladder through which a lighter-than-air gas may be introduced to inflate the bladder and which may be closed to confine the gas within the bladder, a two-position electric switch secured within said neck so constructed and arranged that in one of said positions said switch is open and in the other thereof it is closed to close an electric circuit therethrough, means normally holding said switch in one of said two positions, a connection between said holding means and the balloon bladder at a point distant from the neck so constructed that expansion of the bladder beyond a predetermined extent will actuate said connection to release said holding means and permit said switch to move to the other of said two positions, and lead wires connected to the poles of the switch and extending out beyond the neck of the bladder.

13. An apparatus for the purpose stated, comprising a balloon bladder composed of a stretchable material, a neck on the bladder through which a lighter-than-air gas may be introduced to inflate the bladder and which may be sealed to confine the gas within the bladder, an electric switch secured within said neck, a retainer for holding said switch in open position, a cord connected at one end to the retainer for releasing the retainer by a pull on the cord to permit the switch to close, means connecting the other end of the cord to the inner surface of the bladder at a point opposite the neck in such a manner that expansion of the bladder by said gas to a predetermined diameter will effect the switch-releasing pull upon the cord, and lead wires connected to the switch and extending out beyond the wall of the neck.

14. An apparatus of the character described, comprising a balloon of stretchable material adapted to be inflated by a lighter-than-air gas, and having a means through which such gas may be introduced for inflating the balloon, a load connected to a neck portion of said balloon, a parachute including a canopy and shroud lines, both completely inside said balloon, a load line connected to said shroud lines and to the neck of said balloon and thence to said load, the parachute canopy being connected to a point inside said balloon distant from the neck portion thereof, said load line being of such length as to permit the greatest possible expansion of said balloon prior to the bursting thereof without tensioning said load line, whereby said balloon may be expanded to the bursting point before straightening out said load line, and upon such bursting the support of the load will be assumed by said parachute.

15. An apparatus for the purpose stated, comprising a balloon of stretchable material and having a neck portion through which a lighter-than-air gas may be introduced to inflate the balloon and which neck may be closed to confine the gas following the inflation, a parachute disposed within said balloon and having a canopy and shroud lines, means connecting said canopy to a point on the inside of said balloon distant from said neck, a load line connecting said shroud lines to the neck of said balloon, means associated with the neck of said balloon for supporting a load, said load line being of such length as to permit of the maximum expansion possible for said balloon prior to its bursting before said line is tensioned, whereby said parachute may assume the support of said load upon the bursting of said balloon, an electric switch secured within said neck, and means responsive to the assuming of the carrying of the load by said parachute for causing said switch to close to complete an electric circuit therethrough.

16. An apparatus for the purpose stated, comprising a balloon of stretchable material and having a neck portion through which a lighter-than-air gas may be introduced to inflate the balloon and which neck may be closed to confine the gas following the inflation, a parachute disposed within said balloon and having a canopy and shroud lines, means connecting said canopy to a point on the inside of said balloon distant from said neck, a load line connecting said shroud lines to the neck of said balloon, means associated with the neck of said balloon for supporting a load, said load line being of such length as to permit of the maximum expansion possible for said balloon prior to its bursting before said line is tensioned, whereby said parachute may assume the support of said load upon the bursting of said balloon, an electric switch secured within said neck, resilient means tending to move said switch to a circuit closing position, a movable element normally holding said switch in an open circuit position, and means operable in response to the assuming of the carrying of said load by said parachute for moving said movable element to permit the operation of said switch by said resilient means to close an electric circuit therethrough.

17. Apparatus for the purpose stated, comprising a balloon of stretchable material and having a neck portion through which a lighter-than-air gas may be introduced to inflate the balloon and which neck may be closed to confine the gas following the inflation, a parachute disposed within said balloon and having a canopy and shroud lines, means connecting said canopy to a point on the inside of said balloon distant from said neck, a load line connecting said shroud lines to the neck of said balloon, means associated with the neck of said balloon for supporting a load, said load line being of such length as to permit of the maximum expansion possible for said balloon prior to its bursting before said line is tensioned, whereby said parachute may assume the support of said load upon the bursting of said balloon, an electric switch secured within said neck, a spring means tending to move said switch to a circuit-closing position, a movable pin arranged in said switch for holding it in an open circuit position, and means securing said pin to said load line intermediate said shroud lines and said load and at a point on said load line more distant from said load than said electric switch so that upon the tensioning of said load line incident to the parachute assuming the support of said load, said pin is moved to permit the closing of said switch to complete an electric circuit therethrough.

LEONARD P. FRIEDER.
WALTER S. FINKEN.